(No Model.)
J. L. DEAN.
CONVERTIBLE BICYCLE.
No. 576,557. Patented Feb. 9, 1897.
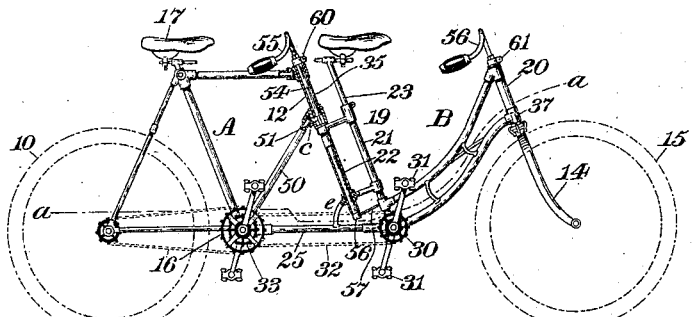
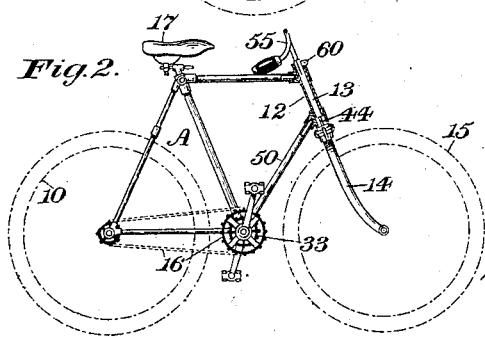
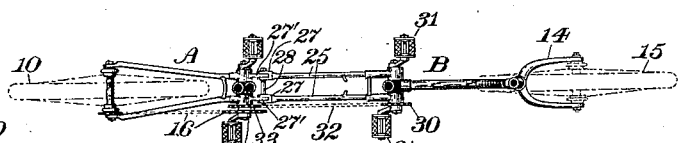
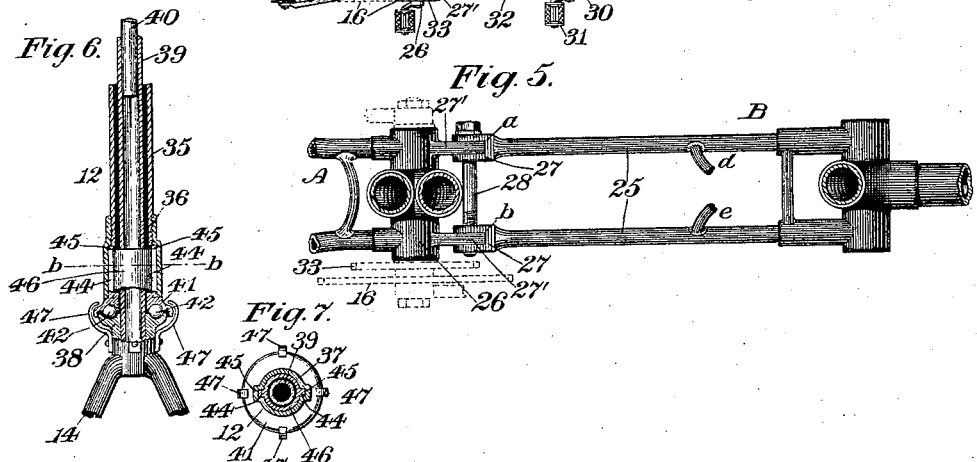
Witnesses:
J. L. Edwards Jr.
Fred. J. Dole.
Inventor:
James L. Dean.
By his Attorney,
F. H. Richards.

UNITED STATES PATENT OFFICE.

JAMES L. DEAN, OF WINSTED, CONNECTICUT.

CONVERTIBLE BICYCLE.

SPECIFICATION forming part of Letters Patent No. 576,557, dated February 9, 1897.

Application filed December 12, 1895. Serial No. 571,880. (No model.)

*To all whom it may concern:*

Be it known that I, JAMES L. DEAN, a citizen of the United States, residing at Winsted, in the county of Litchfield and State of Connecticut, have invented certain new and useful Improvements in Convertible Bicycles, of which the following is a specification.

This invention relates to velocipedes of that class more particularly known as "convertible bicycles;" and the object of the invention is to furnish an improved bicycle in which the frame thereof is separable for enabling the user to assemble the separable parts thereof, either as an ordinary "single" safety or as a "tandem" bicycle, as may be desired.

A further object of my invention is to provide a bicycle of this class in which the frame thereof will be strong and durable and of great rigidity and strength, and in which the parts thereof can be quickly and easily assembled either as a single safety or as a tandem bicycle.

A further object of my invention is to provide a detachable frame which can be removably secured to the single safety-bicycle frames ordinarily in use and thereby form a tandem.

It will be understood that my invention comprises, in a general way, an ordinary single-bicycle frame having a head, a separable frame also having a head, and a rotatable journal or stem for insertion into the head of the single frame, and a removable front-wheel-carrying frame having a journal or stem adapted to be inserted into the head of the single frame to form a single wheel or into the head of the separable frame to form a tandem, and that the details of construction herein described and shown are simply for the purpose of showing a means of assembling the wheel, it being obvious that other constructions of details—such, for instance, as the means for securing the fork into the heads of the frames—could be used.

In the drawings accompanying and forming part of this specification, Figure 1 is a side view of my improved convertible bicycle assembled as a tandem. Fig. 2 is a similar view thereof assembled as a safety-bicycle. Fig. 3 is a side view of that portion of the frame adapted to be secured to the ordinary single-bicycle frame to form the tandem. Fig. 4 is a top view of the bicycle assembled as a tandem, taken in the line $a\,a$, Fig. 1. Fig. 5 is a top view of a portion of the single-bicycle frame and a portion of the detachable frame and shows one means for securing the same together. Fig. 6 is a vertical partly sectional view of a portion of a bicycle-head and of one means for removably connecting the fork or carrying-frame of the front wheel thereto, and Fig. 7 is a cross-sectional view taken in line $b\,b$, Fig. 6.

Similar characters of reference represent like parts in all the figures of the drawings.

The usual parts of a single or a tandem bicycle—such as the wheels and the means for supporting and guiding the same, the saddles and the means for supporting the same, the driving mechanism, the handle-bars, and means for guiding and connecting the two handle-bars when the machine is assembled as a tandem—may be of any ordinary or well-known construction and do not constitute an essential part of my present invention.

My improved tandem frame herein shown combines a single-bicycle frame and a detachable or removable frame. The single-bicycle frame comprises some ordinary single frame, (designated in a general way by A,) herein shown, for the purposes of this description, as the usual diamond-shaped frame, (see Fig. 2,) adapted to carry at its rearward end the ordinary driving-wheel 10 and provided at its forward end with the usual bicycle-head or journal-bearing 12, of any suitable construction, adapted to receive the stem or journal 13 of the usual fork 14, carrying the front wheel 15. This frame also carries the ordinary saddle, as 17, and some suitable driving apparatus, herein shown as the usual chain-and-sprocket gearing 16, for actuating its driving-wheel 10.

The detachable or removable portion of the tandem frame (designated in a general way by B, Fig. 3) may be of any suitable construction adapted to give the same sufficient rigidity and strength and is provided at the forward end thereof with the usual bicycle-head or journal-bearing 20, likewise of any suitable construction, for receiving the stem or journal 13 of the fork 14, carrying the front wheel 15 of the bicycle, said head corresponding, substantially, with the bicycle-head 12 of the single frame A. In the preferred form thereof herein shown and described the detachable frame B is provided with an upright member 19, preferably comprising two members 21 and 22, the forward member 21 thereof being preferably tubular for receiving the supporting bar or rod 23 of the forward saddle, while the rearward member, which is likewise preferably tubular, preferably corresponds at its upper end with the stem or journal 13 of the fork 14, carrying the front wheel 15 of the bicycle, and is adapted, therefore, to fit into the head 12 of said single frame A.

The lower portion of the detachable frame B is shown provided with rearward extensions or side bars 25, by means of which said detachable frame may be removably secured in place to the single frame A. The extensions 25 are shown herein preferably secured to the pedal-shaft-bearing casing 26 of the single frame A by means of some suitable fastening—such, for instance, as a bolt 28—extending through eyes in the ends of the extensions 25 and suitable projections 27', extending from the pedal-casing 26. These side bars constitute the lower bracing of the frame, and the two relatively remote fastening-points $a$ and $b$ thereof, (see Fig. 5,) coacting with the single upper fastening-point $c$, (see Fig. 1,) constitute a triangular framing of great rigidity and strength, while the two relatively remote points $d$ and $e$ of the framing, coacting with said single upper fastening-point $c$, likewise constitute a triangular framing of great rigidity, such triangular framing being ample to meet all practical requirements.

The detachable frame B is shown provided with a driving-shaft sprocket-wheel 30 and pedals 31, and when the frames A and B are assembled together to form a tandem bicycle (see Figs. 1 and 4) said sprocket-wheel 30 will be connected by a driving-chain 32 with a sprocket-wheel 33, located on the pedal-shaft of the single frame A.

Owing to the construction and organization of the single and separable frames A and B of the bicycle, the separable frame is readily made to correspond with the frame of the ladies' safety-bicycle, whereby when said frames are assembled the wheel can be used as a tandem for a lady and gentleman.

If it is desired, the head 20 of the detachable frame B may be connected to the upright member 19 of said frame by a fixed or by a detachable rod, thereby forming the usual gentlemen's tandem.

According to one means for removably connecting the front-wheel-carrying frame or bicycle-fork 14 with the head 12 of the single frame A or with the head 20 of the detachable frame B, in the preferred form thereof herein shown and described, the head or journal bearings 12 and 20 of both said single frame A and detachable frame B consist of a tubular member 35, (see Fig. 6,) preferably having an enlarged lower end 36, having keyways or grooves 45, and each of which members 35, if desired, may embody, as in the construction shown, a laterally-extending coupling for the frame members, as 50. The bicycle-fork or wheel-carrying frame, which is usually in the nature of a spring-fork, may be of any ordinary construction, having the usual stem or journal 13 for insertion in the heads; but in one form thereof, which is herein shown for illustrating my invention, the fork has at its upper end proper a member 38, having an annular groove or recess, whereby it is adapted to form one part of the head-bearing. The other member of the head-bearing comprises a thimble 41, having a disk-shaped lower portion having an annular recess or groove forming with the grooved or recessed member 38 of the fork a way for the reception of suitable antifriction-balls 42, said thimble having ears or wings 44, adapted to engage in the keyways or slots 45 of the enlarged end 36 of either head 12 or 20, according as the wheel is assembled as a single or tandem bicycle, and whereby the turning of the member 41 with the member 38 is prevented. The disk-shaped portion of the thimble also has a part thereof, as 46, extending into the said enlarged lower end, and thereby forming an additional holding means therefor.

As a means for holding said bearing members 38 and 41 together during the removal of the fork from one head to the other suitable spring-clips 47 are secured in position to have their free ends engage the upper bearing member 41.

Secured to the upper end of the fork and preferably forming a part of the bearing member 38 is the stem or journal proper, which is herein shown in the nature of a tubular member 39, rotatable within the tubular sleeve 35 and thimble 41 and preferably split at its upper end to receive the rod 40 of the handle-bars 55 or 56.

The tubular member 22 of the upright member 19 is also provided at its upper end with extending wings or ears 51, adapted to enter the keyways or slots of the enlarged end 36 of the head 12, which is similar to the enlarged end 36 of the head 20 of the detachable frame B, as hereinbefore stated, and whereby said tubular member is rigidly held against torsional movement. Rotatably secured within this tubular member is a stem or journal proper, which is herein shown in the nature of a tubular member 54, similar to the tubular member 39 of the fork and likewise preferably split at its upper end to receive one of the handle-bars, as 55, in the usual manner. The lower end of this member 54 extends below the tubular member 22 and is provided with a laterally-extending arm 56 for the purpose of connecting said member 54 with the fork by a suitable rod 57.

In assembling the parts of the wheel to form a tandem bicycle the usual clamping-collar 60, Fig. 2, is loosened, the handle-bar 55 removed, and the stem or journal 39 of the front-wheelcarrying frame or fork 14 withdrawn from the head 12 of the wheel and inserted into the head 20 of the detachable frame B. The handle-bar 55 is then inserted into the split tubular stem or journal 39, extending through the head 20, and clamped therein by a clamping-collar 61. The stem or journal 54 of the tubular member 22 of the upright member 19 is then inserted into the head 12 of the single frame A, the handle-bar 55 inserted into said split stem or journal 54 and clamped therein by a clamping-collar 60. The side bars 25, which in the form shown are provided with bifurcated ends 27, adapted to receive projections or extensions 27', secured to the pedal-shaft-bearing casing 26, are then secured to such extensions 27' by means of a suitable fastening device, such as a bolt 28, and when the extra sprocket-wheel chain 32 is placed in position the bicycle is ready for use as a tandem.

By reversing the steps above set forth the wheel can be quickly and easily turned into a single safety-bicycle.

Having described my invention, I claim—

1. A detachable frame for a convertible bicycle, having a head; and having two parallel side bars rigidly connected with said frame, and adapted for attachment to a single-frame bicycle; and also having an upright member embodying a part for supporting a saddle; and a member carrying a rotatable stem or journal for the reception of a handle-bar, and adapted, together with said stem or journal, for insertion into the head of a single-frame bicycle.

2. A convertible bicycle comprising a single-bicycle frame having a head; a detachable frame, also having a head, and having a rotatable stem or journal for insertion into the head of a single frame, and for the reception of a handle-bar; and a wheel-carrying frame, also having a stem or journal for insertion into the head of the detachable frame to form a tandem, or for the insertion into the head of a single frame to form a single bicycle, and also adapted for the reception of a handle-bar.

3. A convertible bicycle comprising a single-bicycle frame having a head; a detachable frame also having a head and an upright member embodying means for the attachment of a saddle, and a member carrying a stem or journal rotatable therein, and adapted for insertion into the head of the single frame, and for the reception of a handle-bar, and two parallel side bars rigidly connected with said detachable frame, and adapted for attachment to the single frame; and a wheel-supporting frame, also having a stem or journal for insertion into the head of the detachable frame to form a tandem, or for insertion into the head of the single frame to form a single wheel, and adapted to receive a handle-bar.

4. In a bicycle, the combination of a head having a keyway or slot on its interior; a removable wheel-carrying frame having a part thereof forming one member of a bearing, and having a member extending into said head, and adapted to support a handle-bar; a thimble having a wing or ear engaging the keyway or slot of the head, and forming the other member of the bearing; and spring-clips carried by one of the bearing members for detachably securing said bearing members together.

5. In a convertible bicycle, the combination of a single-bicycle frame having a head having keyways or slots on its interior; a detachable frame comprising a head, also having keyways or slots on its interior; two parallel side bars rigidly connected with said detachable frame, and adapted for attachment to the single frame; and an upright member having wings or ears at its upper end adapted to engage the keyways or slots of the single-frame head, said upright member carrying a rotatable journal or stem for insertion into said single-frame head; and a wheel-carrying frame comprising a bearing member having an annular groove or recess forming one member of a ball-bearing; a thimble having an annular groove or recess, and forming the other member of the bearing, and also having ears or wings adapted to engage the keyways or slots of either the single-frame or detachable-frame head; spring-clips carried by one of said bearing members for engagement with the other bearing member; and a stem or journal adapted for insertion into either of said heads.

6. In a convertible bicycle, the combination of a single frame having a head; a detachable frame, also having a head, and having an upright member adapted for insertion into said single-frame head; a journal or stem extending through said upright member and rotatable therein, and also extending through said head, and adapted to receive a handle-bar; and a wheel-carrying frame, also having a stem or journal adapted for insertion into the head of the detachable frame to form a tandem, or into the head of the single frame to form a single bicycle; and a bar or rod connecting the rotatable stem or journal of the detachable frame below the upright member thereof with the stem or journal of the wheel-carrying frame.

JAMES L. DEAN.

Witnesses:
RICHARD T. HIGGINS,
JAMES E. DEAN.